United States Patent [19]
Cirino

[11] 3,725,890
[45] Apr. 3, 1973

[54] MOTION SENSITIVE ALARM SYSTEM
[75] Inventor: John C. Cirino, Lyndhurst, Ohio
[73] Assignee: Gregory Sales Co., Cleveland, Ohio
[22] Filed: Mar. 17, 1971
[21] Appl. No.: 125,127

[52] U.S. Cl. ................340/262, 340/65, 340/261, 200/61.49, 200/61.51
[51] Int. Cl. .............................................G08b 13/02
[58] Field of Search.......340/65, 261, 262; 200/67 C, 200/61.45, 61.46, 61.49, 61.51

[56] References Cited

UNITED STATES PATENTS

| | | | |
|---|---|---|---|
| 3,562,706 | 2/1971 | Mason | 340/65 |
| 3,394,237 | 7/1968 | Baker | 200/61.45 |
| 2,802,204 | 8/1957 | Kennelly et al. | 340/261 |
| 3,329,935 | 7/1967 | Wiggins | 340/65 |
| 1,298,055 | 3/1919 | Kershaw | 340/65 |

Primary Examiner—John W. Caldwell
Assistant Examiner—Marshall M. Curtis
Attorney—Watts, Hoffmann, Fisher & Heinke

[57] ABSTRACT

A motion sensitive alarm system having a sensing mechanism for actuating an alarm device in response to rotational motion, i.e., being tilted, as well as in response to linear motion. The alarm system includes a generally V-shaped conductive cage, a flexible rod having one end portion fixedly mounted, and an elongated cylindrical weighted member carried by the other end portion of the flexible rod. The cylindrical weighted member is disposed in a direction generally perpendicular to the direction of the elongated flexible rod. Accordingly, the weighted member begins oscillating in response to either rotational or linear acceleration. When the weighted member begins oscillating, it contacts the V-shaped conductive cage to thereby actuate the alarm device. The alarm device remains energized for a predetermined period of time and is then de-energized by a time-delay thermal relay.

26 Claims, 3 Drawing Figures

PATENTED APR 3 1973      3,725,890
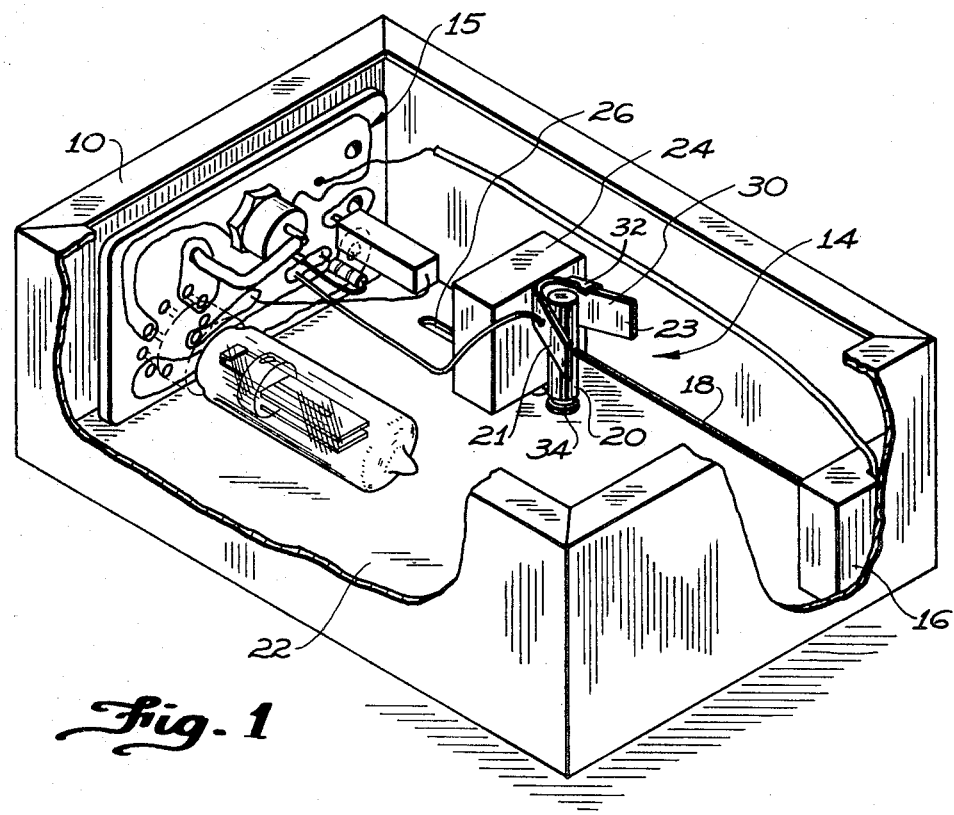
Fig. 1
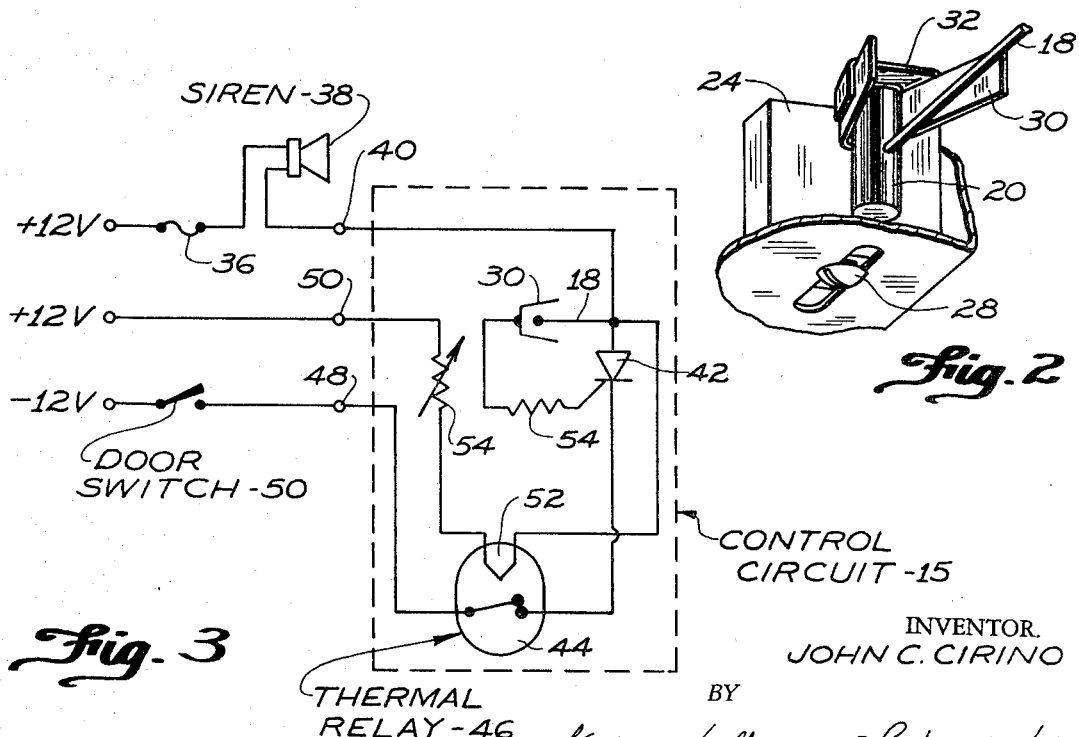
Fig. 3
Fig. 2
INVENTOR.
JOHN C. CIRINO
BY
Watts, Hoffmann, Fisher & Heinke
ATTORNEYS

MOTION SENSITIVE ALARM SYSTEM

BACKGROUND OF THE INVENTION

The present invention pertains to the art of alarm systems, and more particularly to motion sensitive alarm systems for actuating an alarm device in response to motion or acceleration.

The present invention is particularly applicable to alarm systems for detecting the presence of an unauthorized person in a motor vehicle, and the invention will be discussed with particular reference thereto; however, it is to be appreciated that the invention has broader applications and may be employed to actuate various devices in response to motion.

In the art of alarm systems for motor vehicles, there is a substantial need for an alarm system that is responsive not only to linear vibration and/or acceleration, but a system which is also responsive to slight rotation of the vehicle about an axis.

In the past it was common practice to provide alarm systems for motor vehicles which were sensitive or responsive to vibration. These systems were generally quite satisfactory if an unauthorized person gained entry into the vehicle and began driving the vehicle. Once the vehicle contacted a rough surface in the road, the alarm system would actuate an alarm device. For most situations, these systems provide adequate protection.

These previous systems are not, however, responsive to the rotation of a motor vehicle about an axis, i.e., are not responsive to a motor vehicle being slightly tilted. For this reason, with these systems it is possible for an unauthorized person to gain entry into a vehicle for the purpose of removing an article from the vehicle without actuating the alarm device.

There has also been a substantial need for an alarm system in which the sensitivity of the system may be altered so that the system will respond to a desired level of motion or acceleration but will be insensitive to lower levels of motion. In other words, if a system is utilized as an alarm system for motor vehicles, the system should be responsive to motion imparted to the vehicle by an unauthorized person attempting to gain entry into the vehicle, but should not be responsive to motion imparted to the vehicle by other factors, such as wind.

SUMMARY OF THE INVENTION

The present invention is directed toward an alarm system having a motion sensitive mechanism for actuating an alarm device in response to both rotational and linear motion or acceleration. Such a system makes possible the detection of unauthorized use of a motor vehicle, as well as the unauthorized entry into a motor vehicle. Also, the present invention is directed toward an alarm system having a motion sensitive mechanism having variable sensitivity so that the system responds to only a desired level of motion or acceleration.

In accordance with the present invention, there is provided an alarm system including a motion sensing mechanism comprised of an elongated flexible rod having one end portion fixedly mounted, a pair of spaced apart conductive wall members, and an elongated cylindrical weighted conductive member mounted on the other end portion of the flexible rod. The cylindrical weighted member has an axis which extends generally perpendicular to the longitudinal axis of the flexible rod. The cylindrical weighted member is disposed between the conductive wall members and is normally in spaced relationship with respect to each of the wall members. Thus, the cylindrical weighted member may be set into oscillation in response to either linear or rotational motion or acceleration.

In accordance with another aspect of the present invention, the elongated cylindrical conductive member is mounted on the flexible rod at substantially a midpoint between the ends of the cylindrical conductive member so that the cylindrical conductive member begins oscillating about a longitudinal axis of the rod in response to rotational acceleration.

In accordance with another aspect of the present invention, the spaced apart wall members take the form of a generally V-shaped conductive bracket member.

In accordance with another aspect of the present invention, the motion sensing mechanism includes an elongated track. The V-shaped conductive member is mounted on the track for movement toward or away from the cylindrical weighted member. This movement allows the sensing mechanism to be adjusted to respond to different levels of motion or acceleration.

In accordance with another aspect of the present invention, there is provided an alarm system comprising a motion sensing mechanism for developing a control signal. The motion sensing mechanism includes a pair of spaced apart conductive wall members, an elongated flexible rod having one end portion fixedly mounted, a conductive weighted member carried by the other end portion of the flexible rod and disposed between and in spaced relationship with respect to each of the conductive wall members. The alarm system also includes an electronic control device, such as a silicon controlled rectifier, having a first electrode, a second electrode and a control electrode. The electronic control device exhibits the characteristics of normally presenting a high impedance to the flow of a signal from the first electrode to the second electrode and upon application of a control signal to the control electrode presenting a low impedance to the flow of a signal from the first electrode to the second electrode. Once the control device has been actuated to a condition of low impedance to the flow of a signal, the device remains in this condition until the signal flowing from the first electrode to the second electrode is interrupted. The first electrode of the electronic control device is adapted to be coupled to an alarm device so that when a signal flows from the first electrode to the second electrode, the alarm device is energized. The second electrode of the electronic control device is adapted to be coupled to a source of potential, and the control electrode is coupled to the sensing mechanism. The alarm system also includes an actuatable device, such as a time-delay thermal relay, for interrupting the signal flowing between the first and second electrodes of the electronic control device at a predetermined period of time after this signal begins flowing. Thus, at a predetermined period of time after the alarm device is energized, the actuatable device interrupts the signal flowing between the first and second electrodes of the electronic control device to thereby de-energize the alarm device.

In accordance with another aspect of the present invention, there is provided an adjustable device for varying the predetermined time interval between energization and de-energization of the alarm device.

In accordance with another aspect of the present invention, there is provided an alarm system including a motion sensing mechanism having a pair of spaced apart conductive wall members, a rod member having one end portion fixedly mounted, and an elongated weighted conductive member carried by the other end portion of the rod member. The elongated weighted member is disposed so that a longitudinal axis of the elongated weighted member extends in a direction generally perpendicular to the direction of a longitudinal axis of the rod member. In addition, the rod member exhibits the characteristic of returning the other end portion of the rod member to an original position upon being released after having been deflected in a direction generally perpendicular to the longitudinal axis of the rod member. Also, the rod member exhibits the characteristic of returning the other end portion to an original position upon being released after being rotated about the longitudinal axis. The alarm system also includes a control circuit having an electronic control device with a first electrode, a second electrode, and a control electrode. The control device exhibits the characteristic of being actuated from a first condition to a second condition upon the application of a control signal to the control electrode. The sensing device is coupled to the control electrode of the electronic control device and is adapted to be coupled to a source of potential. The first electrode is coupled through a first circuit to an alarm device and the second electrode of the electronic control device is coupled through a second circuit to a source of potential. Thus, the alarm device is energized upon the application of a control signal to the control electrode by the sensing mechanism.

The primary object of the present invention is the provision of an alarm system having a motion sensitive mechanism for actuating an alarm device in response to motion or acceleration.

Another object of the present invention is the provision of an alarm system having a motion sensing mechanism for actuating an alarm device in response to rotational motion of acceleration, as well as linear motion or acceleration.

Another object of the present invention is the provision of an alarm system in which an alarm device is automatically deenergized at a predetermined period of time after the device is energized.

A further object of the present invention is the provision of an alarm system in which after the alarm device is automatically de-energized, the system is automatically reset for another actuation or energization of the alarm device.

Still another object of the present invention is the provision of an alarm system in which the predetermined period of time between energization and de-energization of the alarm device may be varied as desired.

Still another object of the present invention is the provision of an alarm system in which the sensitivity or the response of the system to motion or acceleration may be varied so that only motion in excess of a desired level will actuate or energize the alarm device.

A still further object of the present invention is the provision of an alarm system having extremely low power consumption prior to actuation of the alarm device.

Still another object of the present invention is the provision of an alarm system which is of rugged construction to thereby provide many years of service without requiring maintenance.

These and other objects and advantages of the invention will become apparent from the following description of the preferred embodiment of the invention as read in conjunction with the accompanying drawings in which:

BRIEF DESCRIPTION OF DRAWINGS

FIG. 1 is a perspective view illustrating the motion sensitive alarm system of the present invention;

FIG. 2 is a perspective view illustrating in more detail a portion of the sensing mechanism of the alarm system shown in FIG. 1; and, FIG. 3 is an electrical schematic diagram illustrating the electrical circuitry of the alarm system as shown in FIG. 1.

DESCRIPTION OF A PREFERRED EMBODIMENT

FIG. 1 illustrates an alarm system which may be mounted in a motor vehicle for actuating an alarm device, such as a siren, in response to motion imparted to the vehicle. More particularly, FIG. 1 illustrates an alarm housing unit 10 having a motion sensing mechanism 14 and an electrical control circuit 15 mounted therein.

The motion sensing mechanism 14 is comprised of an insulative support block 16 disposed at one end of the housing unit 10 for rigidly supporting one end of a flexible rod 18. The flexible rod 18 is constructed of spring steel, and preferably takes the form of very small diameter piano wire.

An elongated cylinder weighted member 20 is mounted on and supported by the other end of the flexible rod 18 and is positioned slightly above and out of contact with the bottom wall 22 of the housing unit 10. The longitudinal axis of the cylindrical weighted member 20 extends in a direction generally perpendicular to the direction of a longitudinal axis extending through the flexible rod 18. Also, the longitudinal axis of the cylindrical member 20 extends in a direction generally perpendicular to a plane defined by the bottom wall 22 of the housing 10. As illustrated, the flexible rod 18 joins the cylindrical weighted member 20 at a position which is equally spaced from both ends of the cylindrical member 20. Thus, the cylindrical member 20 may be set into oscillation in a plane generally parallel to the bottom wall 22 of the housing unit 10, in a plane generally perpendicular to the bottom wall 22, or in any plane passing through the line of intersection of these planes. Also, the cylindrical member 20 may be set into rotational oscillation about the longitudinal axis of flexible rod 18.

The motion sensing mechanism 14 also includes an adjustable insulative support block 24 which is positioned adjacent to the cylindrical member 20. An elongated slot 26 extends through the bottom wall 22 and extends in a direction generally parallel to the direction of the longitudinal axis of rod 18.

As illustrated in FIG. 2, a screw member 28 extends through the slot 26 and threadably engages the adjustable support block 24 so that the support block 24 may be moved along the track or slot 26 toward or away from the cylindrical member 22. The screw member 28 may be tightened to lock the adjustable support block at a desired position along the track or slot 26.

A generally V-shaped cage member 30 is mounted on the side of the adjustable support block 24 adjacent to the cylindrical weighted member 20. The arms 21, 23 of the V-shaped member 30 are disposed in a direction so that a longitudinal axis of the flexible rod 18 bisects the acute angle formed by the V-shaped member. Also, the arms 21, 23 of the V-shaped member 30 take the form of a pair of wall members which extend generally perpendicular to the bottom wall 22 of the alarm housing unit 10. The cylindrical weighted member 20 is disposed between the arms 21, 23 of the V-shaped cage member and is normally in spaced relation with respect to the arms 21, 23.

A retaining bracket 32 extends across the top of the V-shaped cage member 30 and extends between the arms 21, 23 of the cage member. This bracket serves to prevent the cylindrical weighted member 20 from being thrown out of the cage member 30, and also provides an electrical contact for the weighted member when the weighted member travels in a vertical direction. An insulative button 34 is attached to the bottom wall 22 of the housing unit 10 at a position directly beneath the cylindrical weighted member 20 in order to prevent the cylindrical member 20 from electrically contacting the bottom wall 22.

The flexible rod 18, the cylindrical weighted member 20, the V-shaped cage member 30, and the retaining bracket 32, are all constructed of materials which exhibit the characteristic of conducting electrical current. Thus, when the cylindrical weighted member 20 contacts either the V-shaped cage member 30 or the retaining bracket 32, or both, an electrical circuit is completed between the flexible rod 18 and the V-shaped cage member 30.

Accordingly, whenever the cylindrical weighted member 20 and rod 18 are set into oscillation, the weighted member 20 contacts the V-shaped cage member 30 or the retaining bracket 32. The cylindrical weighted member 20 may be placed into oscillation by applying either linear motion to the housing unit 10, or by applying rotational motion to the housing unit 10 about an axis generally parallel to a longitudinal axis of the flexible rod 18.

FIG. 3 generally illustrates the control circuit 15 for the alarm system. More particularly, the positive 12 volt terminal of a voltage supply source is connected through a fuse 36 to one of the terminals of an alarm device, such as a siren 38. The other terminal of the siren 38 is connected to one of the input terminals of the control circuit 15.

The input terminal 40 of the control circuit 15 is connected directly to the anode electrode of a silicon controlled rectifier 42 and is also electrically connected to the flexible rod 18. The cathode of the silicon controlled rectifier 42 is connected directly to one of the terminals of a pair of normally closed relay contacts 44 of a thermal time-delay relay 46. The other terminal of the normally closed relay contacts 44 is connected to another input terminal 48 of the control circuit 15. The thermal relay 46 takes the form of an Amprite time-delay Thermal Relay Model No. 6C30T.

The input terminal 48 of the control circuit 15 is connected through a normally open door switch 50 to the negative 12 volt terminal of the voltage supply source. The switch 50 may take various forms, but preferably takes the form of a normally open switch which is actuated to a closed position whenever the door of a motor vehicle is locked.

The thermal relay 52 includes a heating element 52 having one of its terminals connected directly to the anode of the silicon controlled rectifier 42 and its other terminal coupled through a variable resistor 54 to still another input terminal 50 of the control circuit 15. The input terminal 50 is connected directly to the positive 12 volt terminal of the voltage supply source. With a thermal relay of the type indicated above, and with the variable resistor 54 set at a resistance of 7.5 ohms, the normally closed relay contact 44 opens at approximately 45 seconds after the heating element 52 is energized. The gating terminal or the control electrode of the silicon controlled rectifier 42 is coupled through a resistor 54 to the V-shaped conductive cage member 32 to complete the electrical circuit.

Preferably, the alarm housing unit 10 is mounted on the floorboard of a motor vehicle at a position approximately equally spaced from both sides of the vehicle and equally spaced from the front and back of the vehicle. The housing unit 10 should preferably be positioned so that a longitudinal axis of the rod 18 extends from the front of the vehicle to the back of the vehicle. Thus, if an unauthorized person gains entry into the vehicle and sits down in the vehicle, the vehicle will be rotated about an axis extending from the front of the vehicle to the back of the vehicle. This rotation is imparted to the alarm housing unit 10 causing this unit to be rotated about an axis generally parallel to the longitudinal axis of the flexible rod 18. The rotation of the housing unit 10 about an axis parallel to the longitudinal axis of the rod 18 causes the weighted member 20 to begin oscillating about the longitudinal axis of rod 18. This oscillation causes the weighted member 20 to contact the arms 21, 23 of the V-shaped cage member 30 to thereby actuate the control circuit 15. Thus, the mere entry into a vehicle for the purpose of removing an item within the vehicle imparts motion to the sensing mechanism 14 sufficient to actuate the control circuit.

Also, if vertical or lateral motion is imparted to the housing unit 10, i.e., an unauthorized person begins driving the vehicle, the weighted member 20 will be displaced either vertically or horizontally, or in some combination thereof, thereby contacting either the retaining bracket 32 or the arms 21, 23 of the V-shaped cage member 30.

In order to activate the control circuit 15, the normally-open door switch 50 is manually closed. Upon closure of the switch 50, if the cylindrical weighted member 20 contacts the V-shaped cage member 30 or the retaining bracket 32, a gating control is applied to the silicon controlled rectifier 42 thereby causing the device to become conductive. When the silicon controlled rectifier 42 becomes conductive, a current begins flowing through this device, through the normally closed relay contacts 44 of the thermal relay 46, through the closed switch 50, and through the siren 38 thereby energizing the siren 38.

Also, when the silicon controlled rectifier 42 is gated into conduction, the heating element 52 of the thermal relay 46 becomes energized through a circuit including the silicon controlled rectifier 42, the relay contacts 44, the closed switch 50, and the variable resistor 54. After a predetermined period of time, i.e., 45 seconds with variable resistor 54 set at 7.5 ohms, the heating element 52 causes the normally closed relay contact 44 to open thereby interrupting the current flowing through the silicon controlled rectifier 42.

When the current through the silicon controlled rectifier 42 is interrupted, this device returns to a non-conductive state thereby simultaneously de-energizing the siren 38 and the heating element 52. As the temperature of the heating element 52 begins to decrease, the relay contacts 44 again close to reset the control circuit 15 for another actuation. In other words, if the weighted member 20 again contacts the V-shaped cage member 30, the entire operation is repeated for a second 45-second energization of the alarm device or siren 38. The time required for the heating element 52 to open the contact 44 may be varied by varying the resistance of the variable resistor 54 to thereby vary the duration of energization of the siren 38.

The sensitivity of motion sensing mechanism 14 may be altered by moving the adjustable support block 24 and the V-shaped cage member 30 along the track or slot 26. As the V-shaped cage member 30 is moved toward the cylindrical member 20, the spacing between the cylindrical member 20 and the arms 21, 23 of the V-shaped cage member decreases thereby increasing the sensitivity of the mechanism. As the V-shaped cage member is moved away from the cylindrical member 20, the spacing between the cylindrical member and the arms 21, 23 increases thereby decreasing the sensitivity of the mechanism. As the sensitivity of the mechanism is decreased, the level of motion required to actuate the alarm device is increased, and vice versa.

Although the invention has been described in its preferred form with a certain degree of particularity, it is understood that the present disclosure of the preferred form has been made by way of example only and that numerous changes in the details of construction and the combination and arrangement of parts may be resorted to without departing from the spirit and scope of the invention as hereinafter claimed.

Having thus described my invention, I claim:

1. An alarm system comprising:
    a motion sensing device for developing a control signal and including;
    a rod member having one end portion fixedly mounted, said rod member exhibiting the characteristics of returning the other end portion of the rod member to an original position upon being released after being deflected in a direction generally perpendicular to the longitudinal axis of the rod member and of returning said other end portion to an original position upon being released after being rotated about a said longitudinal axis;
    an elongated weighted conductive member mounted on said other end portion of said rod member and having a longitudinal axis which extends generally perpendicular to a longitudinal axis of said rod member;
    cage means comprising a pair of conductive arm members, said conductive weighted member being normally spaced from and disposed between said pair of conductive arm members and being contained by said cage means; and,
    a control circuit including;
        an electronic control means having a first electrode, a second electrode, and a control electrode, for, upon receipt of a control signal on said control electrode, changing from a first condition to a second condition;
        said motion sensing device coupled to said control electrode of said electronic control means and adapted to be coupled to a source of potential;
        first circuit means for coupling said first electrode to an alarm device; and,
        second circuit means for coupling said second electrode to a source of potential so that the alarm device is energized upon application of a control signal to said control electrode by said motion sensing device.

2. An apparatus as defined in claim 1 wherein each of said conductive arm members takes the form of a wall member which extends generally perpendicular to a common plane, and said pair of wall members are disposed with respect to each other so as to define an acute angle.

3. An apparatus as defined in claim 2 wherein said rod member extends from the elongated weighted member in a direction opposite to that of an apex of the pair of wall members.

4. An apparatus as defined in claim 3 wherein said conductive weighted member is comprised of an elongated cylindrical conductive member having a longitudinal axis which extends generally perpendicular to both a longitudinal axis of said rod member and to said common plane.

5. An alarm system comprising a motion sensing device for developing a control signal and including a V-shaped bracket member having a pair of conductive arm members, a flexible rod member having one end portion fixedly mounted, an elongated conductive weighted member carried by said other end portion of said rod member and having a longitudinal axis which extends perpendicular to a longitudinal axis of said rod member, said weighted member disposed between and contained by said pair of conductive arm members and normally in spaced relation with respect to each of said arm members;
    electronic control means having a first electrode, a second electrode and a control electrode, for normally presenting a high impedance to the flow of a signal from said first electrode to said second electrode and upon application of a control signal to said control electrode presenting a low impedance to the flow of a signal from said first electrode to said second electrode and for maintaining a low impedance to the flow of that signal until the signal is interrupted; said first electrode of said electronic control means being adapted to be coupled to an alarm device so that when a signal flows from said first electrode to said second electrode the alarm device is energized; said second electrode being adapted to be coupled to a source of potential, and said control electrode coupled to said motion sensing device for receiving a said control signal;

circuit means for, upon being actuated, interrupting a said signal flowing from said first electrode to said second electrode of said electronic control means; and, actuatable means for actuating said circuit means at a predetermined period of time after said electronic control means exhibits the characteristics of presenting a low impedance to the flow of a signal to interrupt a said signal flowing from said first electrode to said second electrodes of said electronic control means thereby de-energizing the alarm device.

6. An apparatus as defined in claim 5 wherein said alarm system includes an alarm device having one terminal coupled to said first electrode of said electronic control means and the other terminal adapted to be coupled to a source of potential.

7. An apparatus as defined in claim 5 wherein each of said conductive arm members takes the form of a wall member extending generally perpendicular to a common plane, and said pair of arm members are disposed with respect to each other so as to define an acute angle.

8. An apparatus as defined in claim 7 including adjustable means for varying the position of said arm members with respect to said conductive weighted member.

9. An apparatus as defined in claim 8 including elongated track means extending in a direction parallel to a line substantially bisecting a said acute angle formed by said pair of conductive arm members;

a support member mounted on said track means for movement along said track means; and, said arm member comprised of a V-shaped bracket member and being mounted on said support member so that said conductive arm members may be moved closer to said conductive weighted member.

10. An apparatus as defined in claim 9 including means for retaining said support member at a preselected position along said track means.

11. An apparatus as defined in claim 7 wherein said rod member extends from the weighted member in a direction opposite to that of an apex of the V-shaped bracket member.

12. An apparatus as defined in claim 11 wherein said conductive weighted member is comprised of an elongated cylindrical member having a longitudinal axis which extends generally perpendicular to both a longitudinal axis of said elongated rod member and to said common plane.

13. An apparatus as defined in claim 12 wherein said actuatable means comprises a thermal relay having a heating element and a pair of contacts which are actuated in response to an increase in temperature of said heating element, first circuit means coupling said heating element so that said heating element becomes energized when a said signal begins flowing from said first electrode to said second electrode of said electronic control means, and second circuit means coupling said pair of contacts so that when said pair of contacts are actuated a said signal flowing from said first electrode to said second electrode is interrupted to thereby de-energize the alarm device.

14. In an alarm system, a motion sensing device comprising:

an elongated flexible means having one end portion fixedly mounted;

an elongated cylindrical weighted conductive member mounted on the other end portion of said flexible means and having a longitudinal axis which extends generally perpendicular to a longitudinal axis of said elongated flexible means; and, cage means comprising a pair of conductive arm members, said conductive weighted member being normally spaced from and disposed between said pair of conductive arm members and being contained by said cage means.

15. An apparatus as defined in claim 14 wherein each of said conductive wall members extends generally perpendicular to a common plane and said elongated cylindrical weighted member is disposed so that its said axis extends generally perpendicular to a said plane.

16. An apparatus as defined in claim 15 wherein said elongated cylindrical weighted member is mounted on said elongated flexible means at substantially a midpoint between the ends of said cylindrical weighted member.

17. An apparatus as defined in claim 16 wherein said pair of conductive wall members are disposed in the form of a generally V-shaped conductive bracket member.

18. An apparatus as defined in claim 17 including elongated track means, said V-shaped conductive member being mounted on said track means for movement relative to said cylindrical weighted member.

19. An apparatus as defined in claim 18 wherein said elongated track means extends in a direction generally parallel to a said longitudinal axis of said elongated flexible means.

20. An apparatus as defined in claim 19 including adjustment means for maintaining said V-shaped conductive member at a predetermined position with respect to said cylindrical conductive member.

21. In an alarm system, a motion sensing device comprising:

a cage member comprised of a pair of spaced apart conductive wall members disposed in a generally V-shaped configuration;

a flexible rod member having one end portion fixedly mounted; and, a weighted conductive member mounted on the other end portion of said rod member and being disposed between and contained by said pair of conductive wall members and normally in spaced relationship with respect to each of said conductive wall members.

22. An apparatus as defined in claim 21 wherein each of said conductive wall members extends generally perpendicular to a common plane, and said weighted conductive member takes the form of an elongated cylindrical member having a longitudinal axis which extends generally perpendicular to a longitudinal axis of said rod member and being disposed so that its said axis extends generally perpendicular to said common plane.

23. An apparatus as defined in claim 22 wherein said elongated cylindrical weighted member is mounted on said rod member at substantially a midpoint between the ends of said cylindrical weighted member.

24. An apparatus as defined in claim 23 including elongated track means, said conductive wall members being mounted on said track means for movement relative to said cylindrical weighted member.

25. An apparatus as defined in claim 24 wherein said elongated track means extends in a direction generally parallel to a said longitudinal axis of said rod member.

26. An apparatus as defined in claim 25 including adjustment means for maintaining said V-shaped conductive member at a predetermined position with respect to said cylindrical weighted member.

* * * * *